(12) United States Patent
Liu et al.

(10) Patent No.: US 10,108,717 B2
(45) Date of Patent: Oct. 23, 2018

(54) UNIVERSAL INTERNET INFORMATION DATA MINING METHOD

(71) Applicants: Sha Liu, Chongqing (CN); Dongqin Yao, Chongqing (CN)

(72) Inventors: Sha Liu, Chongqing (CN); Dongqin Yao, Chongqing (CN)

(*) Notice: Subject to any disclaimer, the term of this patent is extended or adjusted under 35 U.S.C. 154(b) by 151 days.

(21) Appl. No.: 15/339,994

(22) Filed: Nov. 1, 2016

(65) Prior Publication Data
US 2017/0046434 A1 Feb. 16, 2017

Related U.S. Application Data

(63) Continuation of application No. PCT/CN2015/077686, filed on Apr. 28, 2015.

(30) Foreign Application Priority Data

May 1, 2014 (CN) .......................... 2014 1 0180219

(51) Int. Cl.
G06F 17/30 (2006.01)

(52) U.S. Cl.
CPC ........ *G06F 17/30864* (2013.01); *G06F 17/30* (2013.01); *G06F 17/30315* (2013.01); *G06F 17/30539* (2013.01)

(58) Field of Classification Search
None
See application file for complete search history.

(56) References Cited

U.S. PATENT DOCUMENTS

| | | | |
|---|---|---|---|
| 7,657,540 B1* | 2/2010 | Bayliss ............. | G06F 17/30592 707/609 |
| 2002/0065857 A1* | 5/2002 | Michalewicz ...... | G06F 17/3071 715/259 |
| 2011/0178836 A1* | 7/2011 | Seefeld .................. | G06Q 10/06 705/7.28 |
| 2012/0303664 A1* | 11/2012 | Apacible ............... | G06F 3/0482 707/780 |
| 2014/0222526 A1* | 8/2014 | Shakil .................... | G06Q 50/22 705/7.38 |
| 2014/0235347 A1* | 8/2014 | Zhang ..................... | A63F 13/00 463/35 |

OTHER PUBLICATIONS

Baijun Song, CN 201010149247 A (Apr. 19, 2010), Searching method for accurately querying information according to IP (Internet Protocol) address of keyword (English).*

* cited by examiner

*Primary Examiner* — Syling Yen
*Assistant Examiner* — Soheila (Gina) Davanlou
(74) *Attorney, Agent, or Firm* — Wayne & Ken, LLC; Tony Hom

(57) ABSTRACT

By means of providing directly a data mining requiring user with a universal internet information data mining requirement description human-machine interaction template, the present invention provides big internet data with a set of both open and strictly-defined constraints for concept collection, data structures, and data mining operations, thus satisfying three factors for establishing a data mining model, providing an important condition for increasing the value density of an internet mining service, and allowing for implementation of universal and parallel mining of structured data, semi-structured data, and non-structured data of the internet.

3 Claims, 5 Drawing Sheets

| Inputting any topic keyword (for example, NBA, National Development and Reform Commission, smartphone, cloud computing, Han Han, and European and American movies) |||||||||||
|---|---|---|---|---|---|---|---|---|---|---|
| 10 frequently-used classification of summary information | News | Notice | Knowledge | Product | Service | Interpersonal Communication | On-demand/ Download | Blog/ Microblog | Yellow page | User-added classification (forum) | Free classification |
| Frequently-used top-level structure label | Title | Title | Title | Title | Title | Title | Title | Title | Title | ( ) | No structural summary |
| | Action body | Notice body | Problem | Product name | Service title | Purpose of communication | Name | ... | Name | ( ) | |
| | Action | Notice point | Concept definition | Product description | Service item | Gender | Brief introduction | ... | Types | ( ) | |
| | Time | Notice area | Principle explanation | Manufacturer | Service mode | Age | Leading role | ... | Organization structuring | ( ) | |
| | Place | Notice object | Application method | Product price | Service time | Occupation | Supplier | ... | Contact information | ( ) | |
| | ... | ... | ... | | | | | ... | ... | ( ) | |
| Others | ( ) | ( ) | ( ) | ( ) | ( ) | ( ) | ( ) | ( ) | ( ) | ( ) | |

| 10 frequently-used classification of summary information | Inputting any topic keyword (for example, NBA, National Development and Reform Commission, smartphone, cloud computing, Han Han, and European and American movies) | | | | | | | | | Free classification |
|---|---|---|---|---|---|---|---|---|---|---|
| | News | Notice | Knowledge | Product | Service | Interpersonal Communication | On-demand/ Download | Blog/ Microblog | Yellow page | User-added classification (forum) | |
| Frequently-used top-level structure label | Title | Title | Title | Title | Title | Title | Title | Title | Title | ( ) | No structural summary |
| | Action body | Notice body | Problem | Product name | Service title | Purpose of communication | Name | ... | Name | ( ) | |
| | Action | Notice point | Concept definition | Product description | Service item | Gender | Brief introduction | ... | Types | ( ) | |
| | Time | Notice area | Principle explanation | Manufacturer | Service mode | Age | Leading role | ... | Organization structuring | ( ) | |
| | Place | Notice object | Application method | Product price | Service time | Occupation | Supplier | ... | Contact information | ( ) | |
| | ... | ... | ... | ... | ... | ... | ... | ... | ... | ( ) | |
| Others | ( ) | ( ) | ( ) | ( ) | ( ) | ( ) | ( ) | ( ) | ( ) | ( ) | |

Fig.1

Data mining: topic keyword input box [smartphone]

After the topic keyword is entered, combination search can be performed by choosing words in following drawings:

Click words in the following drawing---- directly invoking relevant information (Multi-choice)

Double click words in the following drawing---- search keyword can be entered under chosen word (Multi-choice)

Click classification words ---- select all

Keyword can be not entered in the topic keyword input box, and can be directly entered in words in the following figure

| Classification | News | Notice | Knowledge | Product | Service | Communication | Download/on demand | Others | More options of pragmatic words |
|---|---|---|---|---|---|---|---|---|---|
| Pragmatic keywords | Topic keyword | Topic keyword | Topic keyword | Topic keyword | Topic keyword | Topic keyword | Topic keyword | Topic keyword | ...... |
| | Title | Title | Title | Title | Title | Title | Title | Free summary | |
| | Action body | Notice body | Problem | Product name | Service item | Purpose of communication | Name | | |
| | Action | Notice point | Concept definition | Product description | Service time | Gender | Brief introduction | | |
| | Time | Notice area | Principle Explanation | Manufacturer | Service place | Age | Leading role | | |
| | ... | ... | ... | ... | ... | ... | ... | | |
| | Others | Others | Others | Others | Others | Others | Others | | |

Types of data mining: webpage ☐  text ☐  picture ☐  video ☐ ..., structured data ☐  summary data ☐  full-text data ☐

Data mining options:
- Publishing information statistics
- Search click rate statistics
- Search result sequence statistics
- Pushing information statistics
- Mining information statistics
- ......

- Data analysis
- History data evolution analysis
- Data correlation analysis
- Future trend analysis
- ......

Other demands description [     ]

[Start data mining]

[Check mining result]

Fig.3

| Summary publishing example | Example canceled |

| | |
|---|---|
| News | |
| Notice | |
| Knowledge | |
| Product | |
| Service | |
| On demand | |
| Download | |
| Communication | |
| Forum | |
| Blog | |
| Website | |
| Yellow page | |
| Free publishing non-structured summary | |

Job wanted ○ work ⊙ leisure ○ activity ○ marriage-seeking ○ dating ○ others ○

| | |
|---|---|
| Publisher | Beijing Hongtu Science & Technology Co., Ltd |
| Purpose of communication | Recruiting |
| Gender | Male |
| Age | Below 30 |
| Occupation | Market manager |
| Expertise | Computer hardware |
| Others | Favorable salary, accomodation |
| Linkable webpage | http://www.hongtu.cn/hr070301.php |

| Directly publishing | Detailed information attached |

Summary publishing    Uploading detailed information
Independent classification of site information
Establishing cloud storage website    Information pushing

Fig.4

| Template for mapping relationship of product (schematic diagram) |||
|---|---|---|
| Accurate search template (product) general structure items | | Any website (product) structure label of structured information |
| Topic keyword | Mandatory item | Topic keyword |
| Title | | Title |
| Product name | Mandatory item | Product name |
| Product description | | Product ingredients, product model, and instruction. |
| Manufacturer | Mandatory item | Manufacturer |
| Product price | | Sales price |
| Others | | Such as retailer |
| Linkable address (including virtual linkable address) | | Linkable address |

Fig.5

UNIVERSAL INTERNET INFORMATION DATA MINING METHOD

CROSS-REFERENCE TO RELATED APPLICATIONS

This application is a continuation of International Patent Application No. PCT/CN2015/077686 with a filing date of Apr. 28, 2015, designating the United States, now pending, and further claims priority to Chinese Patent Application No. 201410180219.4 with a filing date of May 1, 2014. The content of the aforementioned applications, including any intervening amendments thereto, are incorporated herein by reference.

TECHNICAL FIELD

The present invention relates to the field of computer and communication, and more specifically, to a universal internet information data mining method.

BACKGROUND OF THE PRESENT INVENTION

When internet becomes more and more important channel for acquiring all kinds of information, the total information storage on the internet is also high-speed expanded continually. Based on study of IBM, 90% of all the data acquired by total human civilization are generated in past two years. However, the data size generated by the whole world will reach 44 times of today in 2020. Therefore, with the rise of dependence on the internet information and internet application, people needs internet data mining service more and more (service extracting useful information from mass data or database) to improve and increase application efficiency of massive internet information continually.

Internet information includes different kinds of data types (such as text, picture, video, audio, structured data etc.), however, in internet information appeared in form of webpage, word information is not only the most important content, but also the basic tool facing other kinds of data of user organization. Therefore, the top priority of internet information data mining service is to extract data mining result valuable to user from all kinds of structured information (such as all kinds of structured summary), semi-structured information (such as website information, and non-structured information (such as linked plain text information).

The main technical feature of data mining is to perform extraction, transformation, analysis and other modeling processing on mass data in the database, and extract critical data assisting user to make decision. However, in massive internet words information, structured data is of biggest value density and smallest data volume, while semi-structured webpage information and non-structured (plain text) information are of smallest value density and biggest data volume. Therefore, the internet information data mining service is with huge market and big mining difficulty, and a system method with common practical value is not really formed.

The present invention provides a universal internet information data mining method for realizing full and systematic data mining from structured, semi-structured and non-structured word information on the internet and providing mining result valuable to user.

SUMMARY OF PRESENT INVENTION

For better understanding the reasonability and practicality of the present invention, the basic principle of the present invention needs to be explained before explaining the summary of the invention, based on systematic analysis on the search result of internet information full text keyword, "Double Ten Law" of pragmatic word is found, that is, any topic keyword is entered, the frequently-used top-level pragmatic word of target information application function and utility scope is within area of 10 times 10 (see FIG. 1).

Based on above-mentioned "Double Ten Law", the present invention provides a universal internet information data mining method for realizing full and systematic data mining from structured, semi-structured and non-structured words information on the internet and providing mining result valuable to user.

The invention content is as follows: outputting a data mining human-machine interaction template, acquiring a topic keyword, a pragmatic keyword and a common keyword among the pragmatic keyword in data mining from a mining demand keyword input template of the data mining human-machine interaction template acquiring a relevant demand selected by a user and a directly inputted special demand from a relevant mining demand selection column of the data mining human-machine interaction template acquiring a "data mining" operation command and performing the data mining operation on internet information on the basis of acquired data mining demand keyword and acquired mining demand selected by the user and outputting data mining result to relevant demander.

Wherein the mining demand keyword input template, the relevant mining demand selection column and a mining demand free input box are preset in the data mining human-machine interaction template.

Wherein in the mining demand keyword input template of the data mining human-machine interaction template, an any topic keyword input box, a classified integration of frequently-used top-level and lower-level pragmatic keyword for any topic keyword, a data form classification and an instruction for the mining demand keyword input template are preset;

Wherein a generation method of the classified integration result of frequently-used top-level and lower-level summary structure label for any topic keyword is consistent with the generation method of a general summary database structure label for internet information of a universal internet information publishing system.

Wherein the acquired relevant demands selected by the user from the relevant mining demand option of the data mining human-machine interaction template comprises multiple data mining range selections including time, space, region and data source.

Wherein a mining target on "data mining operations" of the internet information includes but not limited to structured information, semi-structured information, relevant detailed information, other linkable website information, and webpage information full text keyword search result acquired by the method of Chinese invention patent Search Method and Device for Pragmatic Words (publication No. CN102880632A).

Wherein a data search of the data mining operation utilizes a keyword of the data mining human-machine interaction template to obtain the topic keyword of required mining information entered by the user acquired in the template, the pragmatic keyword chosen by the user, the common keyword among the pragmatic word or a combination result to perform search on relevant information in the universal internet information publishing system and all kinds of internet information.

Wherein the data mining operations include but not limited to the data search, data statistics, data extraction, data analysis, a relevant modeling automatic processing, and an automatic sorting on information mining result based on user demand.

Wherein the data statistics of the data mining operations include but not limited to statistics about publishing information amount, statistics about search information amount, correlation statistics about the topic keyword, the pragmatic keyword and the common keyword and statistics about click rate.

Wherein the data analysis of the data mining operations includes but not limited to analysis of history data evolution, data correlation analysis and future trend analysis.

And if a mining plan of the data mining special demand freely inputted by the user needs to be designed manually, data mining is performed on the basis of manual design or the mining plan adjustment.

Wherein the universal internet information publishing system of the present invention has following features:

based on above "Double Ten Law", statistics and analysis on frequently-used top-level and lower-level summary structure label for any topic keyword of internet information and classified integration result are performed, above result is acquired and the general summary database structure label for internet information including detailed information link address and a general template for information publishing are automatically generated, user-added top-level and lower-level summary structure label for any topic keyword of internet information on the general template for information publishing is acquired, the general summary database structure label for internet information and the general template for information publishing are automatically adjusted, and user-added structure label is kept in a summary structure label used independently by the user.

Invoking information of user is acquired and a template command is published, and the general template for internet information publishing preset with above frequently-used top-level and lower-level summary structure label of any topic keyword is output, user inputted structured information summary and non-structured summary among "others" on the general template for internet information publishing and structured summary publishing information and non-structured summary publishing information with a mapping relationship of structured information label in other websites and the summary structure label of the universal internet information publishing system are acquired. The user acquiring summary information publishing on the general template for internet information publishing uploads detailed information, or the summary structure label of the universal internet information publishing system is automatically or manually added into uploading detailed information or a thesaurus of webpage information full text keyword search beyond the universal internet information publishing system.

Information storage command is acquired, and acquired summary information is stored into a storage database for general summary information in the universal internet information publishing system, and acquired detailed information is stored into a classified storage database of detailed information in the universal internet information publishing system.

DESCRIPTION OF THE DRAWINGS

FIG. 1 is a schematic diagram of top-level structured label for any keyword.

FIG. 3 is a schematic diagram of a data mining human-machine interaction template.

FIG. 4 is a schematic diagram of a general template for internet information publishing.

FIG. 5 is a setting template for structure label mapping relationship.

Figure 2:
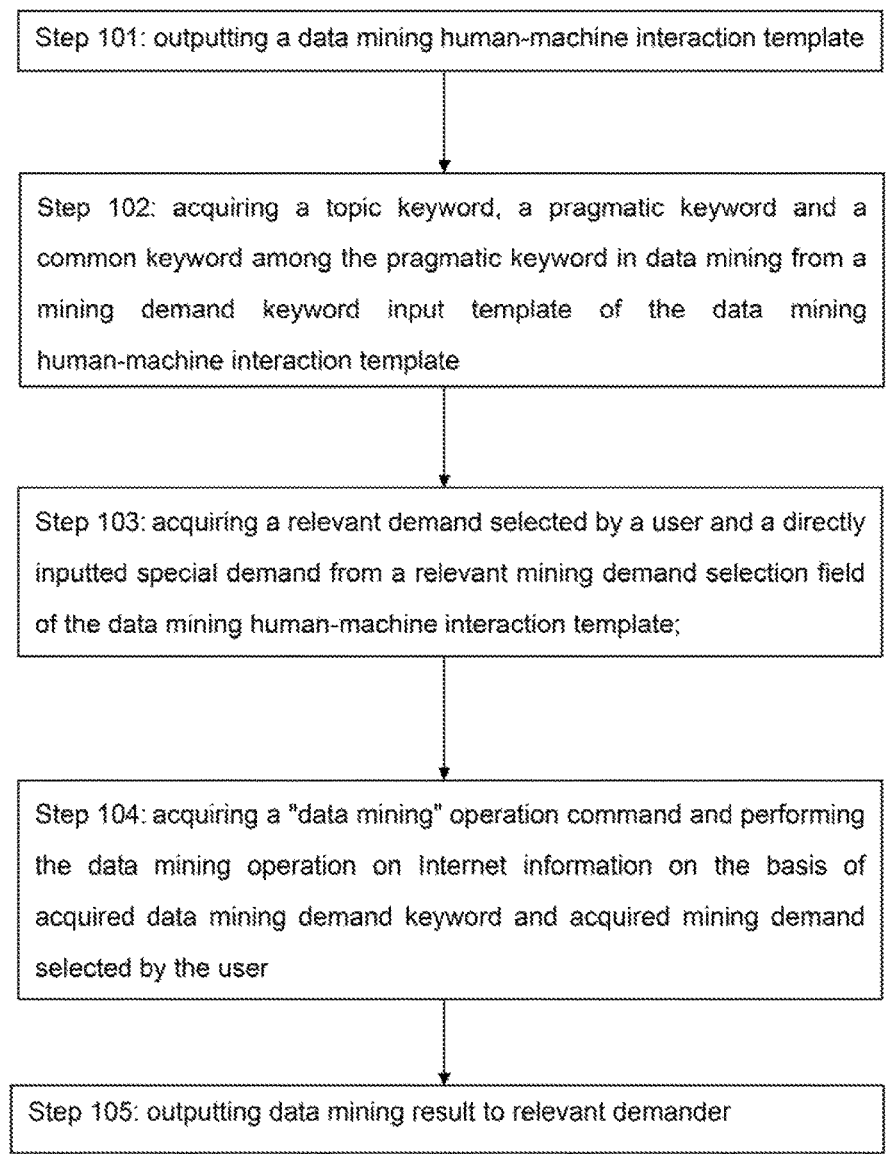
FIG. 2 is a main flow diagram of a data mining method of the present invention.

Explanation of FIG. 3: the first column of FIG. 3 is any topic keyword input box of the mining demand keyword input template, and following words with five lines are instructions for the mining demand keyword input template, middle structured template is the preset mining demand pragmatic word option and keyword input box and relevant data demand classification under pragmatic keyword option; the bottom of FIG. 3 is relevant mining demand option and mining demand free input box.

Explanation of FIG. 5: this figure is a mapping relationship setting template between acquiring universal internet information publishing system summary structure label and structured information label of other websites.

DETAILED DESCRIPTION OF PREFERRED EMBODIMENTS

Embodiment

The present invention provides a universal internet information data mining method for realizing full and systematic data mining from structured, semi-structured and non-structured words information on the internet and providing mining result valuable to user. The main flow comprise following concrete steps:

See FIG. 2 and FIG. 3,

Step 101: outputting a data mining human-machine interaction template (see FIG. 5);

Step 102: acquiring a topic keyword of data mining, a pragmatic keyword of data mining and a common keyword among the pragmatic keyword and data classification demand from a topic keyword input template of the data mining human-machine interaction template;

Step 103: acquiring a relevant demand selected by a user and a directly inputted special demand from a relevant mining demand selection column of the data mining human-machine interaction template;

Step 104: acquiring a "data mining" operation command and performing the data mining operation on internet information on the basis of acquired data mining relevant keyword and acquired mining demand selected by the user;

Step 105: outputting data mining result to relevant demander.

The main application advantages of the present invention are as follows:

The present invention provides massive internet data with a set of both open and strictly-defined integrity constraints for concept collection, data structure and data mining operation, thus satisfying three factors for establishing a data mining model by providing directly data mining demander a universal internet information data mining demand human-machine interaction template, besides, the top-level and lower-level structure (pragmatic word) can not only express relational data structure, but also tree data structure for providing an important condition for increasing the value density of an internet mining result.

Secondly, in the present invention, the universal and parallel mining of structured data semi-structured data, and non-structured data of the internet can be realized.

Thirdly, based on the connection with the universal information publishing system of the present invention, data mining service with universal application demand can be automatically provided on a large scale.

It should be understood by those skilled in the art that the embodiment of the present invention can be provided for method, system or computer program product. Therefore, the embodiment of the present invention can be in the form of complete hardware, complete software or the combination of hardware and software. Besides, the present invention can be in the form of implementing computer program product on one or more computer available storage medium (including but not limited to disk memory and optical memory) including computer available program code.

The present invention is described with reference to the method and apparatus (system) of embodiment of the present invention, and flowchart and/or block diagram of computer program product. It should be understood that each flow and/or block of flowchart and/or block diagram and combination of flow and/or block of flowchart and/or block diagram can be realized by computer program commands.

These program commands can be provided to the processor of general-purpose computer, special-purpose computer, embedded processor or other programmable data processing equipments to generate a machine, so that a device for realizing specified function in one or more flows of flowchart and/or one or more blocks of block diagram is generated by commands executed by the processor of computer or other programmable data processing equipments.

These computer program commands can also be stored in computer readable memory capable of guiding computer or other programmable data processing equipments to work in a particular way, so that the commands stored in computer readable memory generate manufactures including command device, and the command device realized specified function in one or more flows of flowchart and/or one or more blocks of block diagram.

These computer program commands can also be loaded into computer or other programmable data processing equipments, so that a series of operation steps are performed on the computer or other programmable data processing equipments to realize computer processing, thus a step for realizing specified function in one or more flows of flowchart and/or one or more blocks of block diagram is provided by commands executed by computer or other programmable data processing equipments.

Obviously, any modifications and variations can be made within the spirit and scope of the present invention for those skilled in the art. In this way, the present invention includes these modifications and variations if they belong to the scope of claims and equivalent technology of the present invention.

We claim:

1. A non-transitory computer-readable medium storing instructions which, when executed by a processor, cause a device to perform a universal internet information data mining method, comprising following steps:

outputting, executed by the processor, a data mining human-machine interaction template wherein the data mining human-machine interaction template comprises:

a topic keyword input box;

a table comprising:

(1) a classification row having ten classifications consisting of news, notice, knowledge, product, service, interpersonal communication, on-demand/download, blog/microblog, yellow page and user-added classification;

(2) a sub-table including one hundred pragmatics keywords located in ten rows and ten columns, each column of the ten columns including ten pragmatics keywords and corresponding to one of the ten classifications; and each row of the ten rows including ten pragmatics keywords, wherein pragmatics keywords under news classification comprise title, action body, action, time, and place of the news classification;

pragmatics keywords under notice classification comprise title, notice body, notice area, and notice object of the notice classification;

pragmatics keywords under knowledge classification comprise title, program concept definition, principle explanation and application method of the knowledge classification;

pragmatics keywords under product classification comprise title, product name, product description, manufacturer, and product price of the product classification;

pragmatics keywords under service classification comprise title, service title, service item, service mode, and service time of the service classification;

pragmatics keywords under interpersonal communication classification comprise title, purpose of communication, gender, age, and occupation of the interpersonal communication classification;

pragmatics keywords under on-demand/download classification comprise title, name, brief introduction, leading role and supplier of the on-demand/download classification;

pragmatics keywords under blog/microblog classification comprise title of the blog/microblog classification; and pragmatics keywords under the yellow page classification comprise title, name, types, organization structuring, and contact information of the yellow page classification, wherein when one of the one hundred pragmatics keywords is clicked twice, one lower-level common keyword can be selected from a multiple choice; and when the one of the one hundred pragmatics keywords is clicked once, the one of the one hundred pragmatics keywords is directly invoked as a target keyword for data mining;

(3) data mining type options including webpage, text, picture, video, structured data summary data and full-text data;

(4) relevant mining demand options including publishing information statistic, search click rate statistics, search result sequence statics, data correlation analysis, and future trend analysis;

(5) a button of start data mining; and (6) a button of checking mining result:

acquiring, executed by the processor, a topic keyword, pragmatics keyword of the one hundred pragmatics keywords and a lower-level common keyword among the pragmatics keyword in data mining-from a mining demand keyword input template of the data mining human-machine interaction template;

acquiring, executed by the processor, a relevant demand of the relevant mining demand options selected by a user and a directly inputted special demand from a relevant mining demand selection column of the data mining human-machine interaction template;

acquiring, executed by the processor, a first structured data mining operation command performing the first structured data mining operation on a first internet information on the basis of acquired data mining demand keyword and acquired mining demand selected by the user including the topic keyword, the pragmatics keyword, the lower-level common keyword, the relevant demand and the directly inputted special command, wherein the first internet information is published according to the ten classifications outputting, executed by the processor, a data mining result to relevant demander, thus providing massive internet data for concept collection, data structure and data mining operation and satisfying three factors for establishing a data mining model by providing directly data mining demander the universal internet information data mining human-machine interaction template;

mapping a second internet information that is published in a website having three same pragmatics keywords under one classification of the ten classifications as these of the first internet information to the first internet information; and performing a second structured data mining operation on the second internet information that is published in the website.

2. The non-transitory computer-readable medium of claim 1, wherein the mining demand keyword input template, the relevant mining demand selection column and a mining demand free input box are preset in the data mining human-machine interaction template;

wherein in the mining demand keyword input template of-the data mining human-machine interaction template, an input box for any topic keyword, a classified integration of frequently-used top-level and lower-level summary structure label for any topic keyword, a data form classification and an instruction for the mining demand keyword input template are preset;

wherein a generation method of the classified integration result of frequently-used top-level and lower-level summary structure label for any topic keyword is consistent with the generation method of a general summary database structure label for internet information of a universal internet information publishing system;

wherein acquired relevant demand selected by the user from the relevant mining demand selection column of the data mining human-machine interaction template comprises multiple data mining range selections including time, space, region and data source;

wherein a mining target on "data mining operations" of the internet information includes but not limited to structured information, semi-structured information, relevant detailed information and other linkable website information stored in the universal internet information publishing system, and acquired webpage information full text keyword search result;

wherein a data search of the data mining operation utilizes a keyword of the data mining human-machine interaction template to obtain the topic keyword of required mining information entered by the user acquired in the template, the pragmatics keyword chosen by the user, the common keyword under the pragmatics word or a combination result to perform search on relevant information in a universal internet information publishing system and all kinds of internet information;

wherein the data mining operations include but not limited to the data search, data statistics, data extraction, a data analysis, a relevant modeling automatic processing, and an automatic sorting on information mining result based on user demand;

wherein the data statistics of the data mining operations include but not limited to statistics about publishing information amount, statistics about search information amount, correlation statistics about topic keyword, the pragmatics keyword and the common keyword and statistics about click rate;

wherein the data analysis of the data mining operations include but not limited to analysis of history data evolution, data correlation analysis and future trend analysis;

and if a mining plan of the data mining special demand freely inputted by the user needs to be designed manually, the data mining is performed on the basis of manual design or the mining plan adjustment.

3. The non-transitory computer-readable medium of claim 2, wherein the universal internet information publishing system has following features:

statistics and analysis on frequently-used top-level and lower-level summary structure label for any topic keyword of internet information and classified integration result are performed;

above result is acquired and the general summary database structure label for internet information including detailed information link address and a general template for information publishing are automatically generated;

user-added top-level and lower-level summary structure label for any topic keyword of internet information on the general template for information publishing is acquired;

the general summary database structure label for internet information and the general template for information publishing are automatically adjusted, and user-added structure label is kept in a summary structure label used independently by the user;

invoking information of user is acquired and a template command is published, and the general template for internet information publishing preset with above frequently-used top-level and lower-level summary structure label of any topic keyword is output;

user inputted structured information summary and non-structured summary under "others" on the general template for internet information publishing and structured summary publishing information and non-structured summary publishing information with a mapping relationship of structured information label in other websites and the summary structure label of the universal internet information publishing system are acquired;

the user acquiring summary information publishing on the general template for internet information publishing uploads detailed information, or the summary structure label of the universal internet information publishing system is automatically or manually added into uploading detailed information or a thesaurus of webpage information full text keyword search beyond the universal internet information publishing system;

information storage command is acquired, and acquired summary information is stored into a storage database for general summary information in the universal internet information publishing system, and acquired detailed information is stored into a classified storage database of detailed information in the universal internet information publishing system.

* * * * *